United States Patent [19]

Hill

[11] Patent Number: 4,631,797
[45] Date of Patent: Dec. 30, 1986

[54] METHOD OF FORMING FORGED JOINTS

[76] Inventor: Stuart A. Hill, Claydon Forge Old Ipswich Road, Claydon, Suffolk, England

[21] Appl. No.: 497,152

[22] Filed: May 23, 1983

[30] Foreign Application Priority Data

May 22, 1982 [GB] United Kingdom ............... 8215001

[51] Int. Cl.⁴ ............................................. B23P 11/02
[52] U.S. Cl. ...................................... 29/447; 29/509; 29/515; 29/520; 403/278; 403/282; 403/347
[58] Field of Search ................ 29/509, 447, 515, 505, 29/526 R, 520; 403/278, 282, 274, 347

[56] References Cited

U.S. PATENT DOCUMENTS

| | | | |
|---|---|---|---|
| 1,288,706 | 12/1918 | Shanahan et al. | 403/274 X |
| 1,828,358 | 10/1931 | Chryst | 403/282 X |
| 2,846,241 | 8/1958 | McDonnell et al. | 403/282 X |
| 3,497,245 | 2/1970 | Metzger | 403/347 X |
| 3,776,523 | 12/1973 | Weiland | 403/274 X |

FOREIGN PATENT DOCUMENTS 2076925 12/1981 United Kingdom ................ 403/347

Primary Examiner—Charlie T. Moon
Attorney, Agent, or Firm—McGlew and Tuttle

[57] ABSTRACT

Methods of forming joints between bars of materials such as mild steel are disclosed. In one method, the bars are arranged to lie in generally parallel planes but with their axes at an angle to one another, and a plastically-deformable tubular stub of round or square cross-section is disposed between the bars with its axis substantially intersecting the axes of the bars, which are then pressed together to deform the stub partially around the two bars. In a second method, a bar is arranged in a T-formation with a hollow member, two opposed regions at the end of the tubular member are deformed inwardly and back along the member axis, and the bar is then pressed into the groove so-formed at the end of the member, to deform the end portion partially around the bar. Heat may be used, in the former case on the stub and in the latter case on the tubular member, so that after completion of the joint the heated stub or tubular member will cool and contract, firmly to grip the or each bar.

8 Claims, 9 Drawing Figures

METHOD OF FORMING FORGED JOINTS

BACKGROUND TO THE INVENTION

1. Field of the Invention

This invention relates to joints between two members, and particularly to methods of effecting such joints which methods do not require the use of welding or screw-threaded fasteners.

2. Description of the Prior Art

There are many techniques which may be employed when two metallic bar or rod-like members are to be joined together with their axes lying at an angle to one another. A relatively cheap and mechanically most effective technique is to weld together the two members, but often a manually-welded joint is not particularly aesthetically pleasing. Moreover, such a weld requires considerable skill, in order to ensure that the finished joint is mechanically sound. By contrast, a connection using screw-threaded fasteners requires less skill but again is not usually pleasing aesthetically and of course is relatively expensive to implement, in view of the need to drill the members and to provide the screw-threaded fasteners. A clamp device may be used to join together two or more members, and though such a clamp device can be proportioned to give the finished joint an attractive appearance, the cost of such a clamp often is prohibitively high.

OBJECTS OF THE INVENTION

It is a general object of this invention to provide methods of forming joints between two members which methods require relatively little skill to perform and yet can give a mechnically sound joint.

A further object of the invention is to provide methods of forming relatively cheap joints which do not require the use of expensive formed components such as clamps and screw-threaded fasteners, but which can have an aesthetically-pleasing appearance.

Yet another object of this invention is to provide methods of forming connections between mild steel tubes or bars, wherein the effect of thermal contraction can be utilised to form a particularly secure joint.

BRIEF SUMMARY OF THE INVENTION

In accordance with these and other objects of the invention, which will become apparent as the description thereof proceeds, one aspect of the invention provides a a method of forming a joint between two bars so as to extend with their axes at an angle to one another, in which method the two bars are arranged at the required angular disposition but with a space therebetween and a tubular plastically deformable stub is positioned between the two bars with the axis of the stub substantially intersecting the axes of the two bars. Then, the two bars are pressed together thereby plastically to deform the stub so as to become at least partially formed around the two bars, so completing the joint.

Most preferably, this aspect of the invention is performed with the use of a metallic stub which is heated prior to being positioned between the two bars, the stub being allowed to cool after the plastic deformation thereof by the pressing together of the two bars, whereby the stub contracts firmly to grip the two bars.

In accordance with another aspect of this invention, there is provided a method of forming a joint between a bar and a plastically deformable tubular member so as to have the axes thereof extending substantially at right-angles, i.e. a T-joint. In this method, the end portion of the tubular member is deformed inwardly at two opposed regions, and then the bar is pressed on to the deformed end portion with the bar axis overlying the two inwardly deformed regions, the pressing being continued until the end portion of the tubular member is plastically deformed to lie at least partially around the bar.

Again, it is most preferred for the method to be performed with a metallic tubular member at least the end portion of which is heated prior to the bar being pressed thereon, the tubular member being allowed to cool after the plastic deformation thereof, whereby the tubular member end portion contracts firmly to grip the bar.

This invention extends to joints between two bars, or between a bar and a tubular member, whenever produced by a method of this invention.

BRIEF DESCRIPTION OF THE DRAWINGS

The methods of this invention are exemplified in the following description thereof, and reference will be made to the accompanying drawings, as necessary. In the drawings.

DESCRIPTION OF THE PREFERRED EMBODIMENTS

Figure 1:
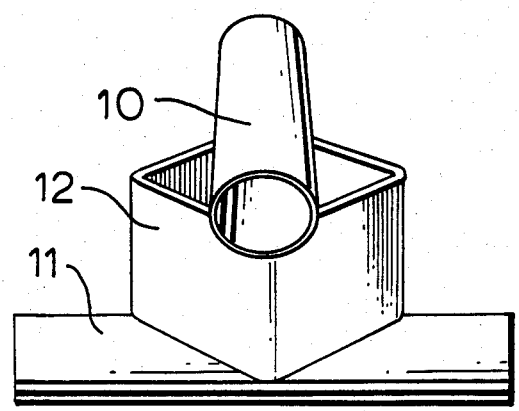
FIG. 1 shows a first stage in forming a joint between two bars in accordance with a first method of this invention.

Performance of the method of forming a joint of this invention, where a separate stub is employed, shows that a joint can be formed between two bars with the outer surfaces of the bars closely adjacent or touching, which joint is aesthetically most pleasing. The only component required other than the two bars themselves is a simple tubular stub cut to an appropriate length and which preferably is heated to a sufficient temperature, and such a stub is of course relatively cheap. Moreover, performance of the method requires no particular skill, once the proprortions of the stub have been determined. In a case where the stub is heated, the joint when completed will be particularly reliable and secure, by virtue of the significant forces generated by the contraction of the stub, upon cooling. The tubular stub may have any suitable cross-sectional shape, but normally circular or square stock would be employed, and though the overall appearance of the joint will vary slightly depending upon the cross-sectional shape of the stock, especially aesthetically pleasing joints are obtained with square stock. The diameter of a circular stub should be substantially equal to twice the diameter of the bars.

In the preferred method where the stub is heated, the contraction of the tubular stub upon the cooling thereof enhances the security of the jont. Thus, the deformation of the stub so as to at least partially to be formed around the two bars should be completed before the temperature of the stub has dropped significantly-but thereafter, cooling of the stub should proceed as rapidly as possible. If significant quantities of heat are transferred from the stub to the two members such that the two bars become heated and expand, subsequently during the cooling there will be no differential contraction between the stub and bars, and a less secure joint will result. Accordingly, though natural cooling may in some cases be satisfactory, forced cooling of the joint is most desirable, particularly where the two bars do not have a particularly high thermal capacity—for example where the two bars comprise metallic tubular members. The forced cooling may for example comprise immersing the joint in a suitable liquid such as in an oil or water bath, or the joint may be cooled by means of a blast of cold air.

The two bars preferably have cross-sectional diameters which are substantially the same or closely similar, but a satisfactory joint can still be obtained with bars of significantly different diameters. Nevertheless, where the bars are of substantially the same diameter, the tubular stub preferably has a diameter (in the case of a circular cross-sectional shape stub) or an across-the-flats dimension (in the case of a square cross-sectional shape stub) equal to approximately twice the diameter of the bars. The length of the stub preferably is equal approximately to twice the bar diameter-but these just-mentioned figures are given to illustrate the order of magnitude of the relative dimensions, rather than to place positive limitations thereon.

Where the diameters of the two bars differ significantly, the performance of the method may be enhanced by providing a groove across the end of the stub which engages with the larger diameter bar, such that the larger bar is partially received in that groove. In this way, the stub may be deformed around the larger bar to an extent sufficient firmly and securely to grip that bar, as well as to grip the other smaller bar.

In accordance with the alternative method of this invention, for making a T-joint, a particularly aesthetically-pleasing joint can be made, at relatively low cost. In fact, with this second method of this invention, no components other than the bar and tubular member themselves need be provided.

In this joint, the end portion of the tubular member is deformed, for example by moving the free edge of the tubular member in the two opposed regions towards each other, so as to confront each other-that is to say, the free edges in the two said regions are moved both radially inwardly and back along the axis of the tubular member. In effect, the end portion of the tubular member then has a generally arcuate groove extending transversely thereacross, with a pair of diametrically opposed 'ears' upstanding on the two sides of the groove. This deformation of the tubular member may be completed to a greater or lesser extent, depending upon the amount by which the tubular member is required finally to encircle the bar.

When making a joint in accordance the preferred second aspect of the invention, the step of heating the tubular member and that of deforming the end portion thereof inwardly may be performed in either order; however, where the tubular member has a relatively thick wall, there may be advantages in heating the tubular member before deforming the end portion, so as to obtain the required form with only relatively low forces.

As with the first-described joint, the security of the joint may be enhanced by the differential contraction of the tubular member as it cools, with respect to the bar. It is therefore important that forced cooling be employed if the thermal capacity of the bar is such that the temperature of the bar would be raised significantly as it is pressed into engagement with the hot end portion of the tubular member. Such forced cooling may be performed by means of an oil or water bath or by means of a blast of cold air.

Excellent results are obtained where both the bar and the tubular member are both of substantially circular cross-sectional shape, though provided the members are appropriately proportioned, satisfactory results can be obtained with other cross-sectional shapes. Where both components are of circular cross-sectional shape, the bar preferably has a diameter which is of the order of one half of the diameter of the tubular member; but where the tubular member is of square cross-sectional shape, the bar should have a diameter which is of the order of one half of the across-the-flats dimension of the tubular member.

Though either joint of this invention could be performed using bars and tubular members of a variety of materials, nevertheless the connection methods particularly lend themselves for use with forgeable metals, but especially metals selected from the group consisting of mild steel, stainless steel, copper alloys, aluminium alloys and titanium. For mild steel, the tubular member or stub which is heated should have its temperature raised sufficiently for that material to reach a red/orange colour; this ensures sufficient plasticity to allow the ready deformation thereof whilst retaining sufficient strength to prevent the collapse thereof, during completion of the joint. Moreover, provided that the joint is subsequently completed quickly, the contraction resulting from the cooling of the tubular member or stub from that temperature will be sufficient most securely to hold the or each bar.

The details of two particularly preferred methods of this invention will now be described, with reference to the drawings as appropriate.

Figure 2:
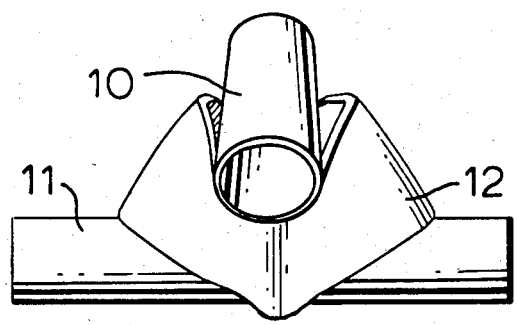
FIG. 2 shows a second stage in forming the joint.
Figure 3:
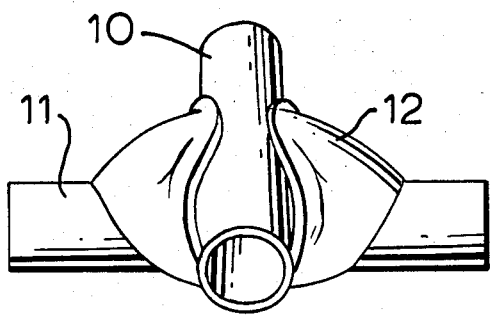
FIG. 3 is a view of the completed joint.

Referring initially to FIGS. 1 to 3, there is shown a method for joining together two bars 10 and 11 such that the axes of the two bars extend at right angles. Each bar is in the form of a mild steel tube of circular cross-sectional shape and with an external diameter d. Initially, the two bars are disposed to overlie one another with their axes at right angles, the closest spacing of the two bars 10 and 11 being arranged to be approximately D, D being equal approximately to 2·d.

The joint is effected by using a mild steel tubular stub 12 of square cross-sectional shape and with an across-the-flats dimension of approximately D. The stub 12 is cut from a piece of stock so as to have a length D and is then heated to a red-orange color—that is, to a temperature roughly within the range of from 900° to 1100° C. The thus-heated stub 12 is then positioned between the two bars 10 and 11, as shown in FIG. 1, in which position the axis of the stub 12 substantially intersects the axis of the two bars 10 and 11, and each pair of opposed corners overlie a bar.

Immediately after the hot stub 12 has been positioned between the two bars 10 and 11, pressure is applied to the two bars so as to move them towards each other. As the bars move together, the stub 12 is deformed, initially as shown in FIG. 2 and the stub 12 eventually takes up the the form shown in FIG. 3, at which stage the two bars 10 and 11 are in contact with each other. As illustrated in FIG. 3, the stub 12 has been deformed to such an extent that it partially encirlces each bar 10 and 11, and the two bars can be separated only if the stub 12 is deformed again.

Immediately after the two bars have been moved together so as to touch, as illustrated in FIG. 3, the stub 12 is cooled, for instance by means of an oil bath or a blast of cold air. This forced cooling should be effected so as rapidly to cool the stub, before a sufficient quantity of heat has been transferred to the bars 10 and 11 to cause sigificant expansion thereof. By cooling the stub quickly in this way, the deformed stub contracts and thus tightly grips the two bars 10 and 11. Provided that the cooling is sufficiently rapid to ensure there is differential contraction between the stub 12 and the bars 10 and 11, the completed joint will hold the two bars together in a most secure manner and in the illustrated relative disposition. Moreover, the shape of the stub in its deformed condition lends an aesthetically-pleasing appearance to the completed joint.

As mentioned in the foregoing, it is important that the deformation of the stub 12 is completed before sufficient heat has been transferred to the bars 10 and 11, to cause significant expansion thereof, for otherwise little differential contraction would take place on cooling the joint, leading to a less secure joint. However, the temperature to which the stub is heated should be sufficiently high to ensure its ready deformation, but should not be so high that the stub has virtually no strength, for then the stub may collapse when the two bars are moved together.

Turning now to FIGS. 4 to 7, there are shown the successive steps of forming a T-joint, also in accordance with this invention. In this joint, the connection is made between a tubular member 15 and a bar 16, both the member 15 and bar 16 being of circular hollow cross-sectional shape and made of a mild steel material. Typically, the bar 16 has a diameter d equal to one half of the diameter D of the member 15.

Figure 8:
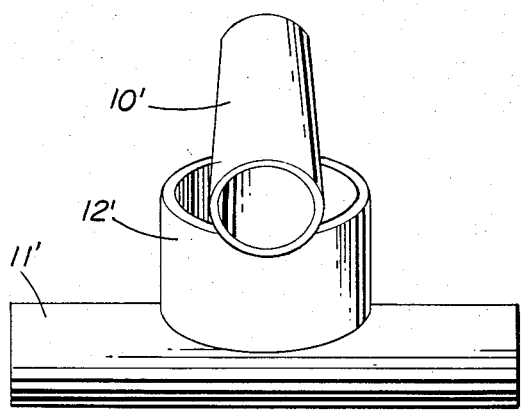
FIG. 8 is a view similar to FIG. 1 showing a stub having a circular cross-section.
Figure 9:
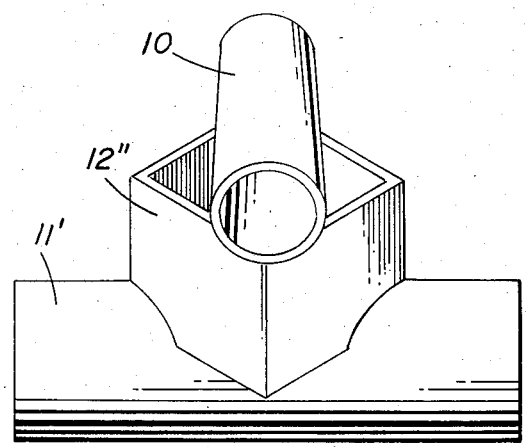
FIG. 9 is a view similar to FIG. 1 showing a stub which can be used to connect bars having significantly different diameters.

FIG. 8 shows an embodiment of the invention wherein stub 12' has a circular cross-section with a diameter substantially equal to twice the diameter of either of the bars 10 or 11. Claim 9 shows an embodiment wherein bar 11' has a significantly larger diameter than bar 10 and where the stub 12" has a groove in its lower end in which bar 11' is received.

Figure 4:
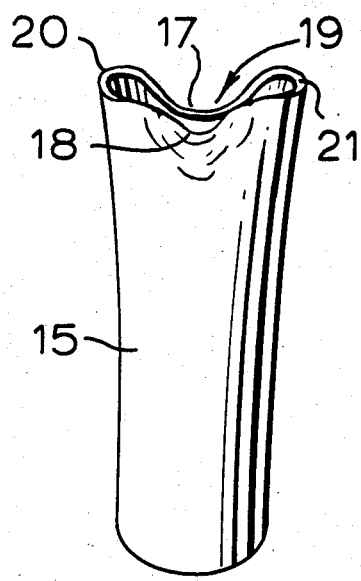
FIG. 4 shows a first stage in forming a joint between a tubular member and a bar in accordance with a second aspect of this invention.
Figure 5:
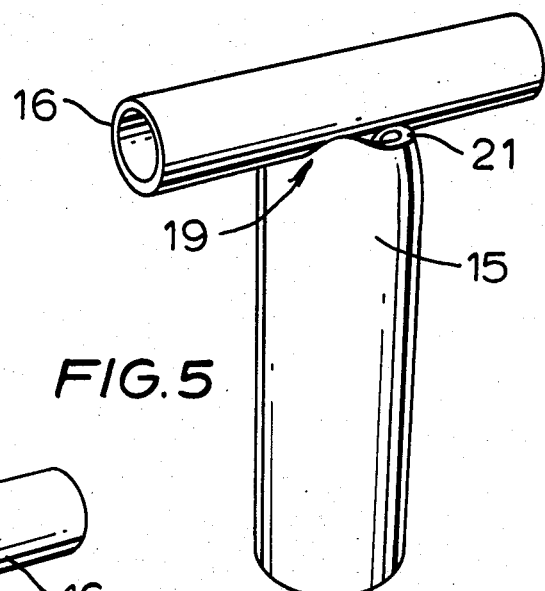
FIG. 5 shows a second stage in the second method.

The first step in forming the joint is the heating of the end portion of the member 15 to a temperature sufficient to give the member 15 a red-orange colour. Then, the end portion is deformed so as to shape the end portion substantially as illustrated in FIG. 4. This is achieved by moving two diametrically opposed regions 17 and 18 of the free edge of the member 15 both radially inwardly towards each other and axially back along the length of the member 15. Such deformation is continued until said two regions 17 and 18 are in contact—or almost in contact—with each other, and the final effect is the provision of a groove 19 extending diametrically across the end portion, with two 'ears' 20 and 21 upstanding one to each side of that groove 19.

Figure 6:
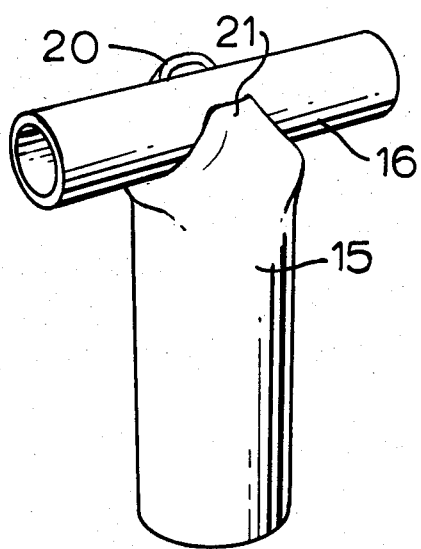
FIG. 6 is a view of the completed T-joint.
Figure 7:
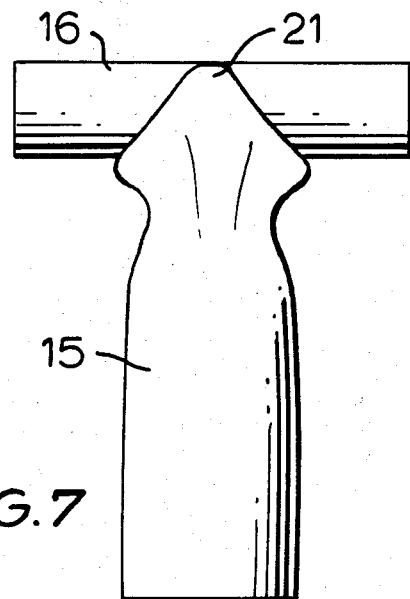
FIG. 7 is a side view of the completed joint of FIG. 6.

Immediately, and before the temperature of the end portion has fallen too much, the bar 16 is positioned across the groove 19 such that the axis of the bar 16 is at right-angles to the axis of the tubular member 15. Pressure is then applied to the bar 16, so as to move the bar along the axis of the tubular member 15, thus deforming the end portion of the tubular member. The movement of the bar 16 is continued until the ears 20 and 21 have become formed partially around the bar 16, as the bar moves deeper into engagement with the tubular member. As illustrated in FIGS. 6 and 7, the ears 20 and 21 move to such an extent that they partially encircle the bar 16, so as to resist the withdrawal of the bar.

As soon as the tubular member deformation has reached the stage illustrated in FIGS. 6 and 7, the tubular member 15 is cooled rapidly, for instance by means of an oil bath or a blast of cold air. This cooling should be effected before sufficient heat has been transferred to the bar 16 to cause significant expansion thereof, such that differential contraction may take place: this cooling thus causes the end portion of the tubular member 15 securely to grip the bar 16, when the joint is cold.

In performing the just-described method, the temperature to which the end portion of the tubular member 15 is heated should be sufficiently high so as to allow the ready deformation thereof, but not so high that the end portion collapses. As mentioned, a red-orange colour is suitable, for the case of a mild steel tubular member, and if necessary a secondary heating step may be employed following the initial forming of the tubular member.

As with the first-described joint, the T-joint described with reference to FIGS. 4 to 7 is aesthetically-pleasing, whilst being relatively simple and quick to perform. Moreover, no special skill is necessary in the forming of either above-described joint and, because no machined parts such as bolts or clamps are required, the joints are relatively cheap to effect.

I claim:

1. A method of forming a joint between two bars so as to extend with the axes of the bars at an angle to one another and using a tubular stub of a plastically-deformable material, which method comprises the steps of:
   arranging the two bars at the required angular disposition but with a space therebetween;
   positioning the tubular plastically deformable stub between the two bars with the axis of the stub substantially intersecting said axes of the two bars; and
   pressing the two bars together thereby plastically to deform said stub so as to become at least partially formed around and interlocked with said two bars.

2. A method according to claim 1 and wherein said two bars are of circular cross-sectional shape of similar diameters, in which said tubular shape is of circular cross-sectional shape and has a diameter substantially equal to twice the diameter of said bars.

3. A method according to claim 1, and wherein said two bars are of circular cross-sectional shape of similar diameters, in which said tubular stub is of square cross-sectional shape and has an across-the-flats dimension substantially equal to twice the diameter of said bars.

4. A method according to claim 2 or claim 3, in which the length of the stub is substantially equal to twice the diameter of the bars.

5. A method according to claim 1, and wherein the diameters of the two bars differ significantly, in which method a groove is provided across the end of said stub which is engaged with the larger diameter bar, such that the larger bar is partially received in that groove.

6. A method according to claim 1, wherein said tubular stub is metallic, which method includes the step of heating said stub prior to being positioned between the two bars, and said stub is allowed to cool after the plastic deformation thereof by the pressing together of the two bars, whereby said stub contracts firmly to grip the two bars.

7. A method according to claim 6, which method is performed to complete the deformation of said stub so as at least partially to be formed around the two bars before the temperature of the stub has dropped significantly from its initial heated temperature, whereafter the method includes the step of subjecting the completed joint to forced cooling.

8. A method of forming a joint between two bars of circular cross-sectional shape of similar diameters, so as to extend with the axes of the bars at an angle to one another and using a tubular stub of a plastically-deformable metallic material of square cross-sectional shape and with an across-the-flats dimension substantially equal to twice the diameter of said bars, which method comprises the steps of:
- arranging the two bars at the required angular disposition but with a space therebetween;
- heating the metallic stub;
- positioning the tubular plastically deformable stub between the two bars with the axis of the stub substantially intersecting said axes of the two bars;
- pressing the two bars together thereby plastically to deform said stub so as to become at least partially formed around and interlocked with said two bars, the pressing being completed before the temperature of the stub has dropped significantly from its initial heated temperature; and
- subjecting the joint to forced cooling to cause said stub to contract so as firmly to grip the two bars.

* * * * *